United States Patent [19]
Selin et al.

[11] Patent Number: 6,153,306
[45] Date of Patent: Nov. 28, 2000

[54] PAPER COATED WITH POLYLACTIDE AND A METHOD FOR MAKING IT

[75] Inventors: Johan-Fredrik Selin; Maria Skog, both of Helsinki; Elisa Tuhkanen, Koski, all of Finland

[73] Assignee: Neste Oy, Espoo, Finland

[21] Appl. No.: 09/194,084

[22] PCT Filed: May 20, 1997

[86] PCT No.: PCT/FI97/00293

§ 371 Date: Jan. 20, 1999

§ 102(e) Date: Jan. 20, 1999

[87] PCT Pub. No.: WO97/46381

PCT Pub. Date: Dec. 11, 1997

[30] Foreign Application Priority Data

Jun. 4, 1996 [FI] Finland ................................. 962331

[51] Int. Cl.⁷ ............................................. B32B 27/10
[52] U.S. Cl. .................... 428/481; 428/483; 428/537.5; 264/37.32; 264/171.13
[58] Field of Search ................... 428/480, 481, 428/483, 537.5; 264/37.32, 171.13, 171.16

[56] References Cited

U.S. PATENT DOCUMENTS

| 5,380,813 | 1/1995 | Seppala et al. ........................ 528/58 |
|---|---|---|
| 5,498,385 | 3/1996 | Yabusa et al. ..................... 264/171.23 |
| 5,594,095 | 1/1997 | Gruber et al. .......................... 528/354 |
| 5,852,166 | 12/1998 | Gruber et al. .......................... 528/354 |

FOREIGN PATENT DOCUMENTS

| 0534471A1 | 3/1993 | European Pat. Off. . |
|---|---|---|
| 0644219A1 | 3/1995 | European Pat. Off. . |
| 952030 | 4/1995 | Finland . |
| 9408090A1 | 4/1994 | WIPO . |
| 9518169A1 | 7/1995 | WIPO . |
| 9601863 | 1/1996 | WIPO . |
| 9631552 | 10/1996 | WIPO . |

OTHER PUBLICATIONS

WPI, Derwent accession no. 94–329584 TOYOBO KK.

Primary Examiner—Paul Thibodeau
Assistant Examiner—Ramsey Zacharia
Attorney, Agent, or Firm—Birch, Stewart, Kolasch & Birch, LLP

[57] ABSTRACT

The invention relates to a polylactide-coated paper or board product which is made by coextrusion wherein the polylactide is extruded together with a conventional polymer, such as polyolefin, onto the surface of the paper, and after extrusion the polyolefin film is removed and recycled.

9 Claims, 2 Drawing Sheets

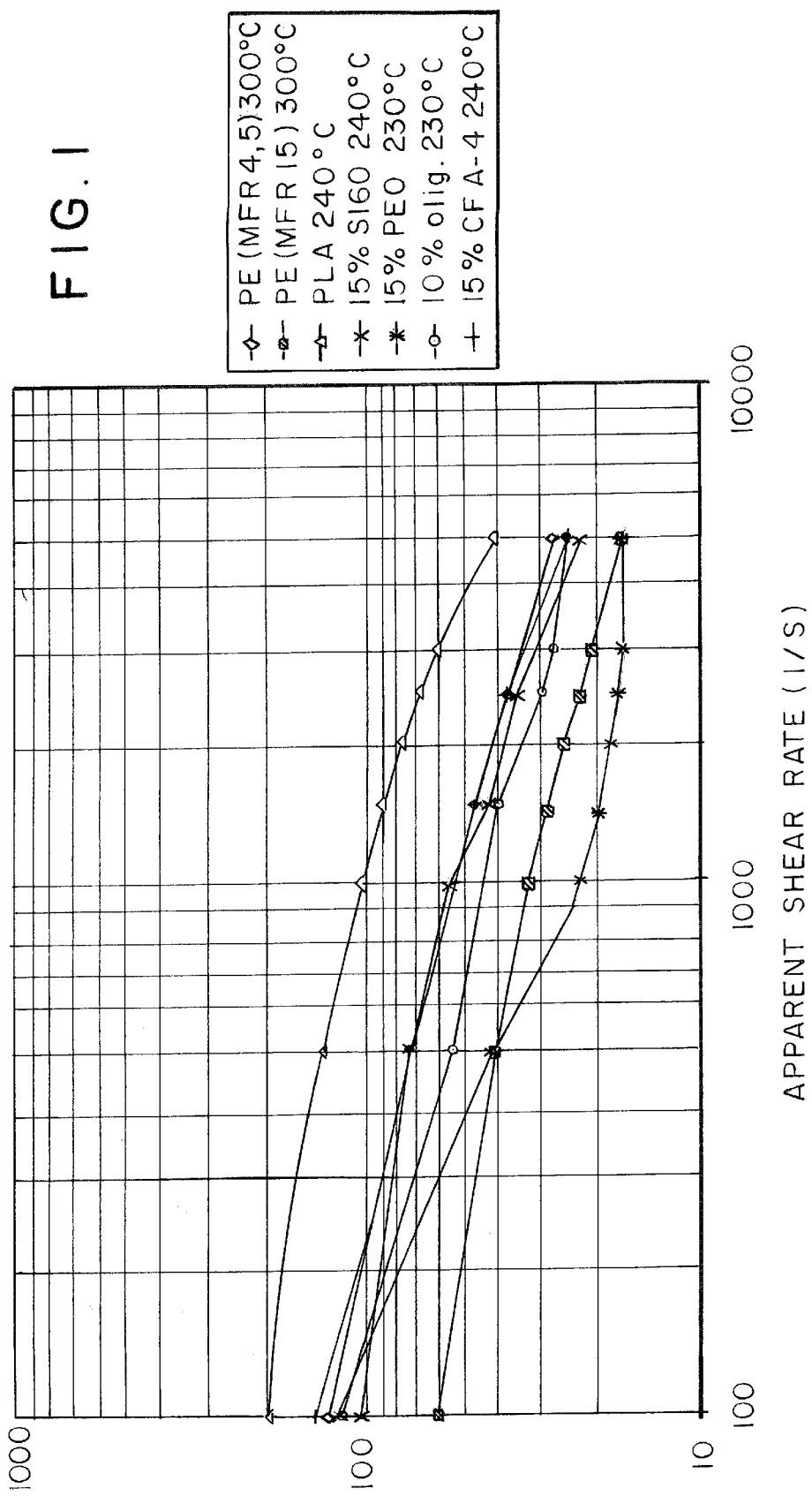

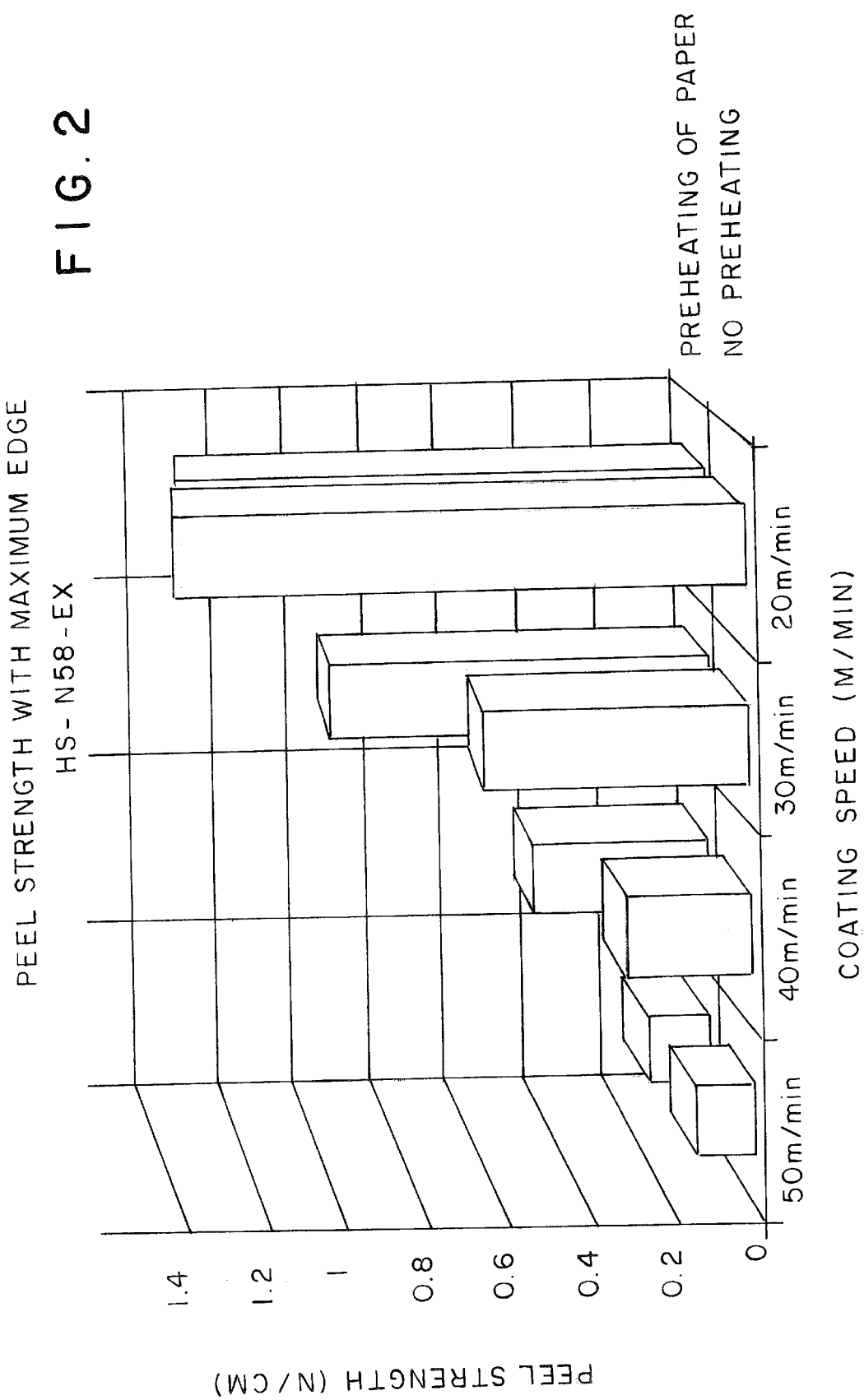

PAPER COATED WITH POLYLACTIDE AND A METHOD FOR MAKING IT

This application is the national phase under 35 U.S.C. §371 of prior PCT International Application No. PCT/FI97/00293 which has an International filing date of May 20, 1997 which designated the United States of America.

The invention relates to paper and board products which are coated with polylactide and to a method for the manufacture of such products.

The coating of paper and board with various polymers or waxes is a commonly used method. The purpose of the coating is to improve resistance to water and other barrier properties, sealability, strength properties and gloss. The coating is typically done with polyolefins, in particular polyethylene, or by using multilayer structures.

One problem involved with coated paper and board is their poor recyclability. Polyethylene, which is commonly used, does not degrade in the conditions used in the repulping of paper. Also, polyethylene-coated paper does not break down completely in nature and does not compost. When the aim is biodegradable products or recycling, the paper must be coated with a biodegradable plastic, such as polylactide.

The extrusion coating technique is typically used in the coating of paper; high temperatures and high run speeds are usually employed in this technique, and additionally a thin but tightly adhering plastic layer is desired on the paper or board.

The use of polylactide for the coating of paper has been described previously in patent publication WO094/08090. The said publication discloses the coating of paper with a chloroform solution which contains 20% of polylactide. Alternatively with molten polylactide, which is added by means of a nozzle very close to the paper surface. By this method it is possible to prepare only a coating which is relatively thick, more than 25 $\mu$m. If the distance of the nozzle from the paper is increased, the molten polylactide is not spread evenly. This is due to the fact that the melt strength of the polymer is not sufficient for the formation of a proper film.

A typical method for the coating of paper is to extrude molten polymer through a nozzle onto a moving paper web. The paper may be treated (activated) by a separate corona or plasma treatment, or even by heating. The distance of the nozzle from the paper is regulated, for example, according to the polymer. The distance affects, for example, neck-in. However, neck-in is also affected by the stabilization of the polymer and by additives; neck-in is greater for an unstabilized polymer than for a stabilized polymer.

The biggest problem in coating with polylactide is the rapid cooling of the polylactide film after it emerges from the nozzle before it ends up on the paper, even if the nozzle is kept as close to the paper as possible. This results in poor mechanical adhesion.

However, it has now been observed, surprisingly, that too rapid cooling of the polylactide can be inhibited by coextrusion, wherein the polylactide is extruded together with some polymer conventionally used for coating, such as polyolefin, in such a manner that the polylactide layer will be against the paper and the polyolefin layer will be topmost. It is preferable to use, for example, polyethylene having a melt index of approx. 5–20 g/10 min. An excellent adhesion of the polylactide film to paper is achieved by this method. After the extrusion, the polyolefin film, which detaches easily from the polylactide coating, is removed before the reeling of the coated paper and is recycled. Thus a compostable, completely biodegradable or easily recyclable paper or board product is obtained.

The difference of polylactide from polyethylene, which is normally used for coating, is its narrower processing window, i.e. lower resistance to high temperatures and more rapid cooling. Characteristics typical of polylactide, on the basis of which adhesion would be very good, are its lower viscosity and high polarity. Low viscosity will cause good mechanical adhesion through spreading onto the paper and into its pores. Polarity causes dipole—dipole interactions with normally polar paper fibers. The oxygen and gas barrier properties of polylactide are better than those of polyethylene or polypropylene, but its water vapor barrier properties are poorer. The sealability of polylactide is very good.

Viscosity can be further lowered by means of plasticizing agents. The agents used must, however, be biodegradable and approved for contact with food.

Polylactide has a higher surface energy than typical polyethylene and polypropylene films.

The surface energy of polyolefins is normally 30–33 mN/m, for which reason they have to be treated to improve printability. The surface energy of polylactide is approx. 40–44 mN/m, and thus treatments are not necessary; the coated paper and board products are easily printable.

Lactic acid, the principal degradation product of polylactides, i.e. condensation polymers based on lactic acid, is a product common in nature; it is not toxic and is used widely in the food and pharmaceutical industries. The high molecular weight polymer can be produced by ring-opening polymerization from lactic acid dimer, lactide. Lactic acid is optically active, and thus its dimer appears in four different forms: L,L-lactide; D,D-lactide; L,D-lactide (mesolactide); and a racemic mixture of L,L- and D,D-lactides. By polymerizing these either as pure compounds or in various blend proportions, polymers are obtained which have different stereochemical structures affecting their resilience and crystallinity and, consequently, also their mechanical and thermal properties.

Upon forming, polylactide is in equilibrium with its monomer, lactide. This has sometimes been deemed to be advantageous, since monomers and oligomers may act as plasticizers of the polymer, but it also leads to rapid hydrolysis and causes problems of adhesion in the processing of the polymer. Furthermore, the presence of the monomer lowers thermal stability during melt processing. In general the residual lactide must be removed from the polymer. The lactide content of the polylactide used in the invention is below 5%, preferably below 2%.

The breaking down of polymers during processing can be reduced by the removal of the residual lactide, the maintenance of the water content at a low level (below 200 ppm) or by the addition of commercial stabilizers. In terms of melt processing methods, it is, however, an advantageous method to mix certain peroxides with the polymer, in which case thermal stability remains good and the melt strength of the polymer is improved so as to be sufficient for extrusion (FI935964, F1945264, Neste).

The polylactide used in the invention can be made from L-, D- or D,L-lactide, or blends thereof, by any polymerization process. Copolymers or polymer blends may also be used, but this is by no means necessary for the functioning of the invention. The use of poly-L-lactide is especially advantageous. The weight-average molecular weight ($M_w$) of the polymer according to the invention is approx. 50,000–2,000,000.

Also usable are polymers which are prepared by first polymerizing a low molecular weight oligomer of lactic acid and by linking such oligomers to each other by either urethane or epoxy bonds, as disclosed in patent applications FI924699, FI943250, FI951638 and FI952030.

A polylactide coating can be tailored effectively according to the intended use by the selection of a suitable plasticizer and, when needed, a filler.

Plasticizers and, when so desired, fillers and other additives, are mixed with the polylactide, before extrusion coating, by a conventional melt mixing method, for example in a double- or single-screw extruder or in a batch mixer.

As noted in patent applications FI935964 and FI945264, in polymer stabilization it is possible to use many even commercially available organic peroxide compounds, in particular those from which acids are formed as degradation products. Peroxides acting as stabilizers are characterized by a short half-life, preferably below 10 s, but most preferably below 5 s. Examples which can be given of suitable peroxides include dilauroyl peroxide (half-life at 200° C. 0.057 s), tert-butylperoxydiethylacetate (0.452 s), t-butylperoxy-2-ethylhexanoate (0.278 s), tert-butylperoxyisobutyrate (0.463 s) and tert-butylperoxyacetate (3.9 s), tert-butylperoxybenzoate (4.47 s) and dibenzoylperoxide (0.742 s). The amount of peroxide to be used is approx. 0.05–3% by weight. The required amount depends on the peroxide compound and above all on the desired end product.

The products according to the invention can be used in the manner of conventional coated paper and board products, in particular in applications which aim at minimizing the amounts of waste and/or at processing waste by, for example, composting. This involves in particular various packaging materials, also food packages, as well as disposable plates and cups.

Normal paper and board grades intended for paper coating can be used in products according to the invention. Coextrudable polyolefins are also conventional polyethylene or polypropylene grades suitable for extrusion coating, or copolymer grades thereof.

The invention is described in greater detail with the help of the following examples.

The polylactide used in the experiments was made by ring-opening polymerization from L-lactide with the aid of a stannium octoate catalyst, and it was manufactured by Neste Oy. All of the polylactides used in the examples were stabilized by peroxide in the manner described in patent applications FI935964 and FI945264.

EXAMPLE 1. PLASTICIZED POLYLACTIDE

Rheometer measurements

Processing temperatures were sought by means of rheometric measurements. The measurements were carried out using a Goettfert Rheograph 2002 rheometer. The reference values used were the viscosity curves, measured at 300° C., of two different polyethylene grades, the melt indices of which were 4.5 and 15 g/10 min. It was noted that the viscosity of polylactide corresponded to the reference values at 245° C., whereas the viscosity curves of the plasticized samples corresponded to the reference values already at 230–240° C. The viscosity curves of the plasticized samples as compared with the viscosity curves of polyethylene and pure polylactide are shown in FIG. 1.

All of the polylactide coating experiments were carried out using Wisapak Oy's laboratory-scale extrusion coating machine, which has three extruders and a nozzle having a width of 270 mm. The distance between the paper and the nozzle was 15–80 mm.

The temperatures of the extruder zones ranged from 150 to 200° C. It was not possible to raise the temperatures to the optimal level (230–240° C.) determined in the rheometric measurements without losing the melt strength of the polymer. Two extruders, having rotation speeds of 80 and 260 rpm, were used simultaneously in the experiments. The speed of the coating line was 10–50 m/min.

TABLE 1

Effect of plasticizers on the properties of polylactide

| | Amount p-% | $M_w$ g/mol | D | $MFR_2$ (g/10 min) | Surface energy |
|---|---|---|---|---|---|
| — | 0 | 129000 | 2.4 | 1.2 | 40 |
| Citroflex A-4 | 15 | 125000 | 2.2 | 4.1 | 40 |
| Triacetin | 15 | 121000 | 2.1 | 4.1 | 39 |
| Tripropionin | 15 | 122000 | 2.1 | 4.6 | 42 |
| Santicizer 431 | 15 | 123000 | 2.0 | 3.1 | 42 |
| Santicizer 160 | 15 | 131000 | 2.5 | 6.8 | n.d. |
| Polyethylene glycol | 15 | 2200000 | 34 | 12.2 | n.d |
| Lactid acid oligomer | 10 | 125500 | 2.3 | 9.9 | 43 |

By using plasticized samples, very thin (2–9 g/m²) and resilient coating films were obtained at the coating speeds used. The films were even and glossy. All of the plasticizers except TA and CF A-4 raised the surface energy. The nozzle neck-ins ranged from 26 to 38%. The adhesion of all of these thin films to paper was poor.

EXAMPLE 2. PEROXIDE-MODIFIED POLYLACTIDE

More peroxide was added by extruder mixing to basically stabilized polylactide. The mixing was carried out at 180–200° C. Owing to the peroxide modification, more branching was obtained in the polylactide, its molar mass distribution widened and molar mass increased, its polydispersity increased, and its melt index decreased.

TABLE 2

Effect of peroxide modification on the properties of polylactide.

| TxC content wt. % | $M_w$ g/mol | D | $MFR_2$ g/10 min |
|---|---|---|---|
| 0.1 | 120000 | 2.2 | 1.4 |
| 0.2 | 146000 | 2.4 | 0.8 |
| 0.5 | 207000 | 3.4 | 0.5 |

Owing to the peroxide modification, it was possible to use temperatures of 230–240° C. in extrusion coating. Two extruders, having rotation speeds of 90 and 130 rpm, were used in the trial runs. The coating speed was 10–50 m/min. The coating film obtained was clear, had a basis weight of 9–55 g/m², and its adhesion to paper was moderate, but not sufficient.

EXAMPLE 3. EFFECT OF THE THICKNESS OF THE COATING FILM ON ADHESION

The effect of the thickness of the coating film on adhesion was investigated by increasing the coating speed, whereby the thickness of the coating film was reduced. Two extruders were used in the trial run, their temperatures being 160–220° C. and their rotation speeds 230 and 60 rpm. Preheating of the paper was experimented with by using a thermal pistol. Adhesion was measured by peel strength measurement (by applying the standard ASTM D 1876). It was observed that adhesion decreased linearly as the coating speed increased, i.e. as the coating film became thinner. It was observed that preheating of the paper improved adhesion. FIG. 2 shows the peel strength values at coating speeds of 20–50 m/min.

EXAMPLE 4. FILLED POLYLACTIDE

When paper is coated with polyethylene, fillers are commonly used in order for the polymer to remain hot longer. The use of fillers also with polylactide was investigated. 10–15% by weight of talc was used as a polymer filler material. The extruder temperatures used were 215–220° C., the rotation speeds were 150 and 250 rpm. The coating speeds were 10–40 m/min. The coating film obtained was gray, matte-surfaced and thin, having a basis weight of 4–16 g/m$^2$. The adhesion of the coating film to the paper was poor, although theoretically the filler should keep the polymer temperature longer at a high level, in which case the polymer would form more mechanical bonds with the paper. In this case, however, the talc has acted mainly as an anti-blocking agent.

EXAMPLE 5. COEXTRUSION OF POLYLACTIDE

Coextrusion was carried out as a coextrusion of polylactide and a polyethylene having a melt index of 15 g/10 min, in such a manner that there was polylactide in two extruders and polyethylene in one, the polyethylene film being topmost in relation to the paper. The processing temperatures used were in the extruder 240° C. for polylactide and 275° C. for polyethylene and in the nozzle 255° C. The coating speeds used were 10–50 m/min and the extruder rotation speed was 200 rpm for each. The nozzle was kept at a higher level above the web being coated than in the previous examples, owing to the low neck-in of polyethylene film. The polyethylene film was easy to detach from the obtained coating films before the reeling of the paper, whereas the adhesion of the polylactide film to the paper was excellent. When the coating speed increased above 30 m/min, the polylactide layer became so thin that it no longer detached easily from the polyethylene film. When the screw rotation speeds were lowered to 80–170 rpm, a thickness as small as 8 g/m$^2$ was obtained for the polylactide film while the polyethylene film was still very easily detachable.

As can be observed from the examples above, a good film can be extruded in all cases from peroxide-stabilized polylactides, but owing, to too rapid cooling it will not as such adhere sufficiently well to a paper or board base. By the use of the coextrusion method according to the invention, a coated paper is obtained which has an even, well-adhering polylactide coating.

What is claimed is:

1. A polylactide-coated paper or board product, which is prepared by coextrusion in which the polylactide is extruded together with a polyolefin onto the paper surface in such a manner that the polylactide is disposed adjacent to the paper and the polyolefin is outermost, wherein the polylactide consists of a peroxide stabilized L-polylactide (PLLA) and its monomer content is below 5% by weight, and after the extrusion the polyolefin is removed.

2. A paper or board product according to claim 1, wherein the polylactide is coextruded with polyethylene having a melt index 5–20 g/10 min.

3. A paper or board product according to claims 1 or 2, wherein one or more fillers, in an amount of 0.1–50% by weight, is mixed with the polylactide.

4. A paper or board product according to claim 3, wherein said one or more fillers comprises talc.

5. A paper or board product according to claim 1, wherein a plasticizer in an amount of 0.5–30% by weight is mixed with the polylactide.

6. A polyactide-coated paper or board product as in claim 1, wherein said polyolefin is recycled after removal from said paper or board product.

7. A method to produce a polylactide-coated paper or board product, comprising the steps of:

coextruding a polylactide and a polyolefin;

coating said polylactide and polyolefin onto the surface of a paper so as to form a film on the surface of the paper;

removing the polyolefin from said paper;

reeling said paper; and recycling said polyolefin, wherein said film is made up of a first portion in contact with the paper and a second portion not in contact with said paper and said first portion is comprised on polylactide and said second portion is comprised of said polyolefin, wherein said polylactide consists of a peroxide stabilized L-polylactide with a monomer content below 5% by weight.

8. A polyactide-coated paper or board product with a film comprising at least two layers on top of said paper or board product, wherein a first layer comprises a polylactide adjacent to said paper or board product and a second layer comprises a polymer is on top of said polyactide, wherein the polylactide consists of a peroxide stabilized L-polylactide (PLLA) with a monomer content below 5% weight.

9. A L-polylactide-coated paper or board product, which is prepared by coextrusion in which the L-polylactide is extruded together with a polyolefin onto the paper surface in such a manner that the L-polylactide is disposed adjacent to the paper and the polyolefin is outermost, wherein the L-polylactide consists of a peroxide stabilized L-polylactide (PLLA) and its monomer content is below 5% by weight, and after the extrusion the polyolefin is removed.

* * * * *